(12) United States Patent
Liu

(10) Patent No.: US 12,487,107 B2
(45) Date of Patent: Dec. 2, 2025

(54) CALIBRATION BRACKET

(71) Applicant: AUTEL INTELLIGENT TECHNOLOGY CORP., LTD., Guangdong (CN)

(72) Inventor: Lianjun Liu, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 745 days.

(21) Appl. No.: 17/447,370

(22) Filed: Sep. 10, 2021

(65) Prior Publication Data

US 2021/0404846 A1    Dec. 30, 2021

Related U.S. Application Data

(63) Continuation of application No. PCT/CN2020/080445, filed on Mar. 20, 2020.

(30) Foreign Application Priority Data

Mar. 20, 2019   (CN) .......................... 201910214908.5

(51) Int. Cl.
*G01D 18/00* (2006.01)
*F16M 11/18* (2006.01)
*G01D 11/30* (2006.01)

(52) U.S. Cl.
CPC ............. *G01D 18/00* (2013.01); *F16M 11/18* (2013.01); *G01D 11/30* (2013.01)

(58) Field of Classification Search
CPC ......... G01D 18/00; G01D 11/30; F16M 11/18
(Continued)

(56) References Cited

U.S. PATENT DOCUMENTS 4,930,340 A * 6/1990 Evans .............. B60G 17/01933
73/1.81
5,279,488 A * 1/1994 Fleming ................. B60N 3/002
248/452

(Continued)

FOREIGN PATENT DOCUMENTS

CN   201141918 Y   10/2008
CN   202089156 U   12/2011
(Continued)

OTHER PUBLICATIONS

The International Search Report mailed Jun. 24, 2020; PCT/CN2020/080445.

*Primary Examiner* — Todd M Epps

(57) ABSTRACT

A calibration bracket is provided. The calibration bracket includes a base, a support rod and a hanger. The support rod is movably connected to the base. The hanger is mounted to the support rod. The base has an abutting face. The support rod includes a main rod and an angle adjustment structure. The main rod is connected to the angle adjustment structure. The angle adjustment structure is connected to the base. The angle adjustment structure is rotatable relative to the base. A range of angular rotation of the support rod is controlled by limiting positions in which the main rod of the support rod and the angle adjustment structure abut against the base. The support rod is rotatable within the range of angular rotation relative to the base. The hanger is mounted to the support rod and is configured to hang a calibration element on the support rod.

15 Claims, 8 Drawing Sheets

(58) Field of Classification Search
USPC .......................................... 248/183.2, 205.5
See application file for complete search history.

(56) References Cited

U.S. PATENT DOCUMENTS

| | | | | |
|---|---|---|---|---|
| 9,794,552 | B1* | 10/2017 | Ribble | ................. H04N 17/002 |
| 2006/0113434 | A1* | 6/2006 | Richter | ............... B60R 11/0235 |
| | | | | 248/121 |
| 2021/0404848 | A1* | 12/2021 | Riedel | ..................... G01F 1/667 |
| 2022/0049954 | A1* | 2/2022 | Lai | ........................ G01S 7/497 |

FOREIGN PATENT DOCUMENTS

| CN | 102830288 | A | 12/2012 |
|---|---|---|---|
| CN | 102840427 | A | 12/2012 |
| CN | 202791221 | U | 3/2013 |
| CN | 103645455 | A | 3/2014 |
| CN | 104313987 | A | 1/2015 |
| CN | 105300711 | A | 2/2016 |
| CN | 105758558 | A | 7/2016 |
| CN | 205748613 | U | 11/2016 |
| CN | 107727036 | A | 2/2018 |
| CN | 107966690 | A | 4/2018 |
| CN | 207318527 | U | 5/2018 |
| CN | 109278066 | A | 1/2019 |
| CN | 210036785 | U | 2/2020 |
| TW | 201014775 | A | 4/2010 |
| WO | 2011/118692 | A1 | 9/2011 |

\* cited by examiner

CALIBRATION BRACKET

CROSS-REFERENCE TO RELATED APPLICATIONS

This application is a continuation application of International Application No. PCT/CN2020/080445, filed on Mar. 20, 2020, which claims priority of Chinese Patent Application No. 201910214908.5, filed on Mar. 20, 2019, which is incorporated herein by reference in its entirety.

TECHNICAL FIELD

The disclosure relates to the technical field of vehicle maintenance and repair as well as device calibration, and in particular, to a calibration bracket.

BACKGROUND

An advanced driver assistant system (ADAS) is an active security technology of collecting environmental data inside and outside a vehicle at the prime time by using various sensors mounted to the vehicle to perform technical processing such as identification, detection, and tracking of static and dynamic objects. This causes a driver to perceive a potential danger as quickly as possible, thereby attracting attention and improving security. The ADAS is mainly used to detect light, heat, pressure, or other variables for monitoring a state of the vehicle by using a vehicle-mounted camera, radar, a laser, an ultrasonic wave and the like. During use of the vehicle, vibration, collision, environmental temperature and humidity, and the like change physical mounting states of the foregoing sensors. Therefore, correction or calibration needs to be carried out from time to time.

During correction or calibration of the foregoing sensors, calibration elements are usually hung on the calibration bracket to correct or calibrate the sensors on the vehicle. However, most of the current calibration brackets cannot adjust angles flexibly and cannot meet special calibration angles.

SUMMARY OF THE DISCLOSURE

In order to resolve the foregoing technical problems, embodiments of the disclosure provide a calibration bracket capable of flexibly adjusting angles.

The embodiments of the disclosure adopt the following technical solution to resolve the technical problem.

According to a first aspect, a calibration bracket is provided. The calibration bracket include:
a base;
a support rod including a main rod and an angle adjustment structure, the main rod being connected to the angle adjustment structure, and the angle adjustment structure being movably connected to the base and being configured to adjust an angle of the main rod relative to a ground plane on which the base is located; and
a hanger mounted to the support rod, the hanger being configured to hang a calibration element, the calibration element being configured to calibrate a device in a driver assistant system of a vehicle, the calibration element including a spirit level and a pattern plate.

Optionally, the base includes a limiting portion configured to limit a range of movement of the angle adjustment structure.

Optionally, the base includes a positioning portion configured to fix the angle adjustment structure to a specific position within the range of movement or fix the angle adjustment structure to any position within the range of movement. The positioning portion comprises a hinge shaft and a locking member, and the hinge shaft is inserted into the locking member for fixing the base and the support rod.

Optionally, the limiting portion includes a top face and an abutting face; and
the main rod abuts against the top face when the support rod rotates about the hinge shaft toward the pattern plate to a first position, and in a second position, the angle adjustment structure abuts against the abutting face when the support rod rotates about the hinge shaft in a direction away from the pattern plate to a second position. The range of movement of the angle adjustment structure is between the first position and the second position.

Optionally, the top face is substantially parallel to the ground plane on which the base is located.

Optionally, when the angle adjustment structure abuts against the abutting face, an angle of the support rod relative to the ground plane on which the base is located is greater than 90 degrees.

Optionally, the base includes two hinge portions;
the limiting portion is disposed between the two hinge portions; and
a first through hole is provided on each of the two hinge portions, and a second through hole is angle adjustment structure, an axis of the second through hole coinciding with axes of the two first through holes, and a hinge shaft passing through the first through holes and the second through hole to connect the angle adjustment structure to the two hinge portions.

Optionally, the hanger includes a connecting shaft and a movable shaft;
the connecting shaft is configured to be connected to the support rod; and
the movable shaft is connected to the connecting shaft, the movable shaft is rotatable relative to the connecting shaft to adjust an angle of the movable shaft relative to the support rod, and the movable is configured to hang the calibration element.

Optionally, a receiving cavity is provided on the connecting shaft, the receiving cavity being configured to receive a universal ball, the universal ball being rotatable in any direction in the receiving cavity; and
the movable shaft is connected to the universal ball and is rotatable about a center of the universal ball relative to the connecting shaft.

Optionally, the hanger further includes a locking structure; and
the locking structure is configured to fix a position of the movable shaft relative to the connecting shaft.

Optionally, the locking structure includes a locking screw, a screw hole mated with the locking screw being provided on the connecting shaft, the locking screw passing through the screw hole to abut against the universal ball to fix the position of the movable shaft relative to the connecting shaft.

Optionally, a receiving groove is provided on the connecting shaft, the receiving groove being in communication with the receiving cavity; and
when an axis of the connecting shaft is perpendicular to an axis of the movable shaft, the movable shaft is received in the receiving groove.

Optionally, a spirit level is disposed on the hanger, the spirit level being configured to keep the axis of the movable shaft horizontal.

Optionally, the support rod is inserted into the connecting shaft.

Optionally, the connecting shaft is movable in a length direction of the support rod.

Compared with the prior art, the support rod in the embodiment of the disclosure is movably connected to the base, and the support rod is rotatable relative to the base. A range of angular rotation of the support rod is controlled by limiting positions in which the main rod of the support rod and the angle adjustment structure abut against the base. The support rod can flexibly adjust the angle within the range of angular rotation. The hanger is mounted to the support rod and is configured to hang a calibration element on the support rod. A calibration angle of the calibration element can be flexibly adjusted.

BRIEF DESCRIPTION OF THE DRAWINGS

One or more embodiments are described by way of example with reference to the corresponding figures in the accompanying drawings. The exemplary descriptions are not to be construed as limiting the embodiments. Elements in the accompanying drawings that have same reference numerals are represented as similar elements. Unless otherwise particularly stated, the figures in the accompanying drawings are not drawn to scale.

DETAILED DESCRIPTION OF THE DISCLOSURE

For ease of understanding the disclosure, the disclosure is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. The terms "vertical", "horizontal", "left", "right", "inner", "outside", and similar expressions used in this specification are merely used for an illustrative purpose.

Unless otherwise defined, meanings of all technical and scientific terms used in this specification are the same as those usually understood by those skilled in the art of the disclosure. Terms used in the specification of the disclosure are merely intended to describe objectives of the specific embodiment, and are not intended to limit the disclosure. The term "and/or" used in this specification includes any or all combinations of one or more related listed items.

In addition, technical features involved in different embodiments of the disclosure described below may be combined together if there is no conflict.

A calibration bracket 100 in the embodiment of the disclosure is configured to calibrate an advanced driver assistant system of a vehicle. Before calibration, the calibration bracket 100 is first positioned, so that the calibration bracket is in a preset position relative to the vehicle. Since a calibration element 40 is hung on the calibration bracket 100, the calibration element 40 may be caused to be aligned to a to-be-calibrated device of the vehicle, such as a camera, a radar, and the like. Correspondingly, the calibration element may be a multi-line laser emitter 200, a calibration target, a radar reflection or absorption device, or the like.

Figure 1:
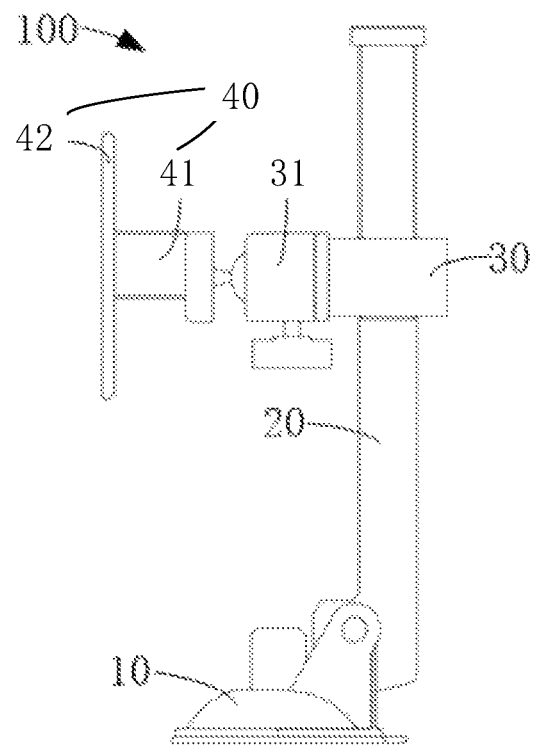
FIG. 1 is a schematic structural diagram of a calibration bracket according to an embodiment of the disclosure.

Referring to FIG. 1, the calibration bracket 100 provided in one of the embodiments of the disclosure includes a base 10, a support rod 20, a hanger 30 and a calibration element 40. The base 10 is hinged to the support rod 20. The support rod 20 is rotatable about the hinge shaft relative to the base 10. The hanger 30 is connected to the support rod 20. The calibration element 40 is hung on the hanger 30.

Figure 2:
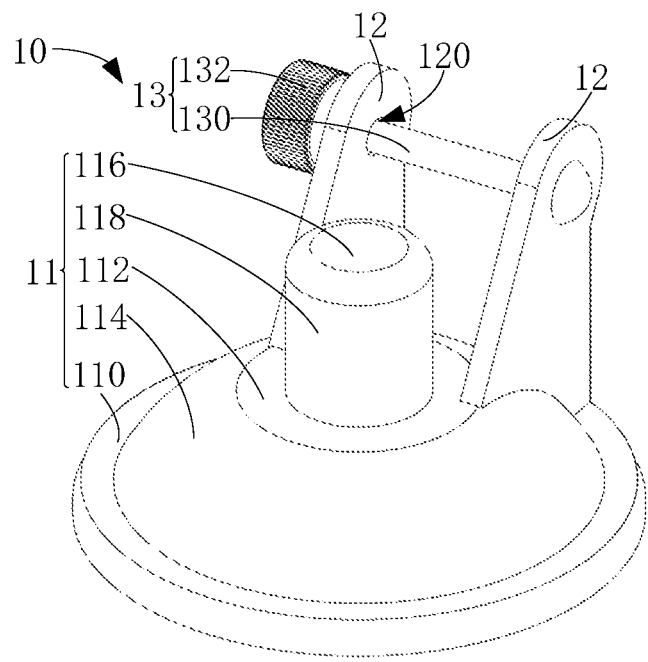
FIG. 2 is a schematic structural diagram of a base of the calibration bracket shown in FIG. 1.

The hinged connection of the base 10 and the support rod 20 means that the base 10 and the support rod 20 are separable or inseparable. The support rod 20 is movable relative to the base 10. For example, the support rod 20 is rotatable about a hinge shaft relative to the base 10. Here, the hinge shaft may be disposed as a shaft in a specific direction according to a mechanism between the base 10 and the support rod 20 or disposed as a universal shaft. Referring to FIG. 2, the base 10 includes a limiting portion 11 and a hinge portion 12. The limiting portion 11 includes a bottom plate 110, an arc-shaped portion and a column. The bottom plate 110 is used to be placed on the ground plane. An arc-shaped portion bulges upward on the bottom plate 110. The arc-shaped portion has an upper surface 112 and an arc face 114. The upper surface 112 faces away from the bottom plate 110. The arc face 114 is connected between the upper surface 112 and the bottom plate 110. The column protrudes from the upper surface 112 of the arc-shaped portion toward a direction away from the bottom plate 110. The column has a top face 116 and an abutting face 118. The top face 116 faces away from the arc-shaped portion 112. The abutting face 118 is connected between the top face 116 and the arc-shaped portion 112. Preferably, the top face 116 is substantially parallel to the ground plane on which the base 10 is located. The hinge portion 12 is provided on the limiting portion 11. The number of the hinge portions 12 is two. Both the hinge portions 12 extend from the bottom plate 110 toward the direction in which the column protrudes. A first through hole 120 is formed on each of the two hinge portions 12. Axes of the two first through holes 120 coincide with each other.

A positioning portion 13 is further provided on the base 10. The positioning portion 13 includes a hinge shaft 130 and a locking member 132. The hinge shaft 130 is inserted into the locking member 132 for fixing the base 10 and the support rod 20.

When the locking member 132 is locked, pressure is applied to the hinge portion. The hinge portion 12 abuts against the support rod and then fixes the support rod relative to the base 10. When the locking member 132 is not locked, the support rod is rotatable about the hinge shaft 130 relative to the base 10 to adjust an angle of the bottom rod relative to the ground plane. For example, the bottom rod is adjusted to be perpendicular to the ground plane before calibration to ensure that the calibration element is perpendicular to the ground plane. Alternatively, during the calibration, the angle of the bottom rod relative to the ground plane is adjusted, according to calibration requirements, to the angle required by the calibration. Here, the ground plane may be understood as a horizontal plane or a plane used to support a vehicle.

Figure 3:
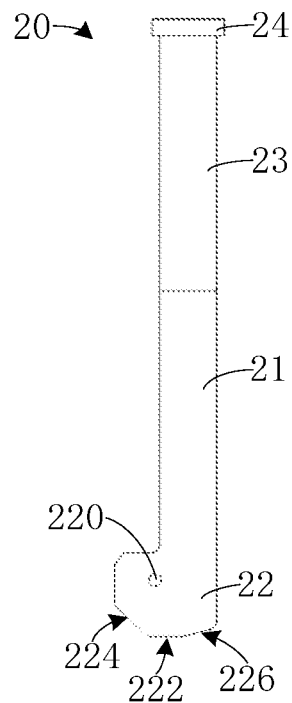
FIG. 3 is a schematic structural diagram of a support rod of the calibration bracket shown in FIG. 1.
Figure 4:
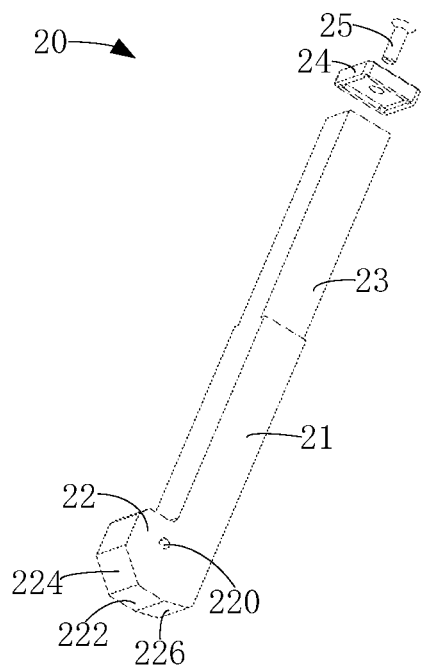
FIG. 4 is a schematic exploded view of the support rod of the calibration bracket shown in FIG. 1.

Referring to FIG. 3 and FIG. 4 together, the support rod 20 includes a main rod 21 and an angle adjustment structure 22. One end of the main rod 21 is connected to the angle adjustment structure 22. One side of the angle adjustment structure 22 protrudes from the main rod 21. A second through hole 220 is provided on the angle adjustment structure 22. The second through hole 220 is provided on the one side of the angle adjustment structure 22 protruding from the main rod 21. That is to say, rotation of the main rod 21 about an axis of the second through hole 220 is eccentric rotation. The angle adjustment structure 22 has a bottom surface 222. The bottom surface 222 is disposed at one end of the angle adjustment structure 22 away from the main rod 21. The bottom surface 222 is perpendicular to a length direction of the main rod 21. A first limiting face 224 is connected to one side of the bottom surface 222 protruding toward the angle adjustment structure 22. A second limiting face 226 is connected to one side of the bottom surface 222 protruding away from the angle adjustment structure 22. The first limiting face 224 and the second limiting face 226 are inclined in different directions relative to the bottom surface 222. An included angle formed by the first limiting face 224 and the length direction of the main rod 21 is an acute angle. An included angle formed by the second limiting face 226 and the length direction of the main rod 21 is an obtuse angle.

A sliding rod 23 is provided at an other end of the main rod 21. A cross section of the sliding rod 23 is rectangular. The cross section of the sliding rod 23 is smaller than a cross section of the main rod 21. A limiting block 24 is provided at one end of the sliding rod 23 facing away from the main rod 21. A cross section of the limiting block 24 is larger than the cross section of the sliding rod 23. The limiting block 24 is locked to one end of the sliding rod 23 by using a fastener 25. The hanger 30 is sleeved on the sliding rod 23. The hanger 30 is movable relative to the sliding rod 23 in a length direction of the sliding rod 23. The moving range of the hanger 30 is a distance between the main rod 21 and the limiting block 24.

Figure 5:
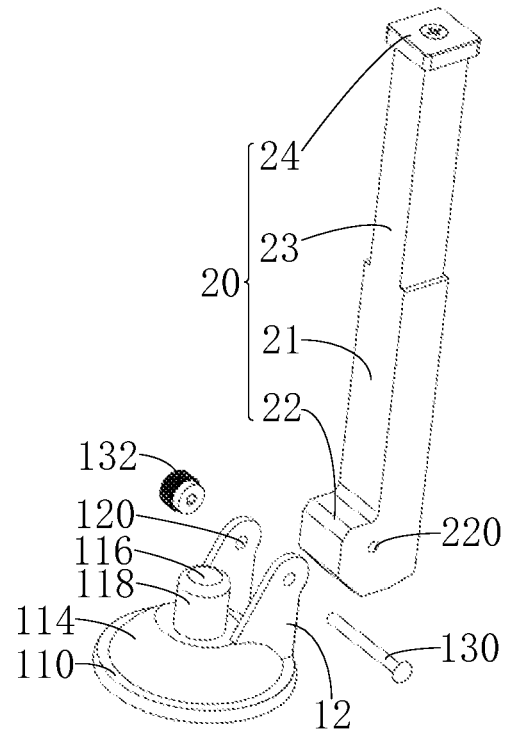
FIG. 5 is a schematic assembly diagram of the base shown in FIG. 2 and the support rod shown in FIG. 3.

Referring to FIG. 5, when the support rod 20 is assembled with the base 10, the angle adjustment structure 22 of the support rod 20 is connected to the hinge portion 12 of the base 10 by using the hinge shaft 130. The angle adjustment structure 22 is rotatable about an axis of the hinge shaft 130 relative to the base 10. The limiting portion 11 of the base 10 is used to limit the rotation range of the angle adjustment structure 22. The angle adjustment structure 22 is provided between the two hinge portions 12. The axis of the second through hole 220 coincides with the axes of the two first through holes 120. One end of the hinge shaft 130 successively passes through one of the first through holes 120, the second through hole 220 and the other of the first through holes 120. The support rod 20 can rotate about the axis of the hinge shaft 130 relative to the base 10. When the support rod 20 is rotated to a proper position, the base 10 and the support rod 20 are locked by using the locking member 132 provided on the hinge shaft 130. The support rod 20 is fixed relative to the base 10 with a range of angular rotation. It may be understood that the locking member 132 may be a fastening nut, an elastic collar, and the like, as long as the support rod 20 can be fixed to the base 10.

Figure 6:
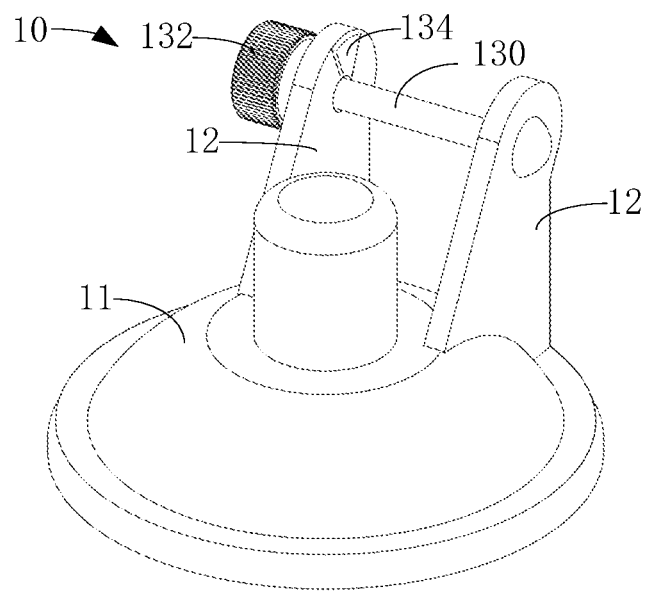
FIG. 6 is a schematic structural diagram of the base according to another embodiment of the disclosure.
Figure 7:
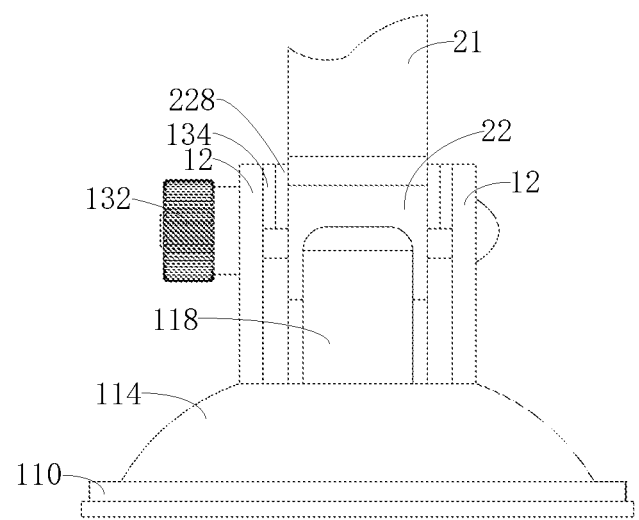
FIG. 7 is a schematic assembly diagram of the base and the support rod according to another embodiment of the disclosure.
Figure 8:
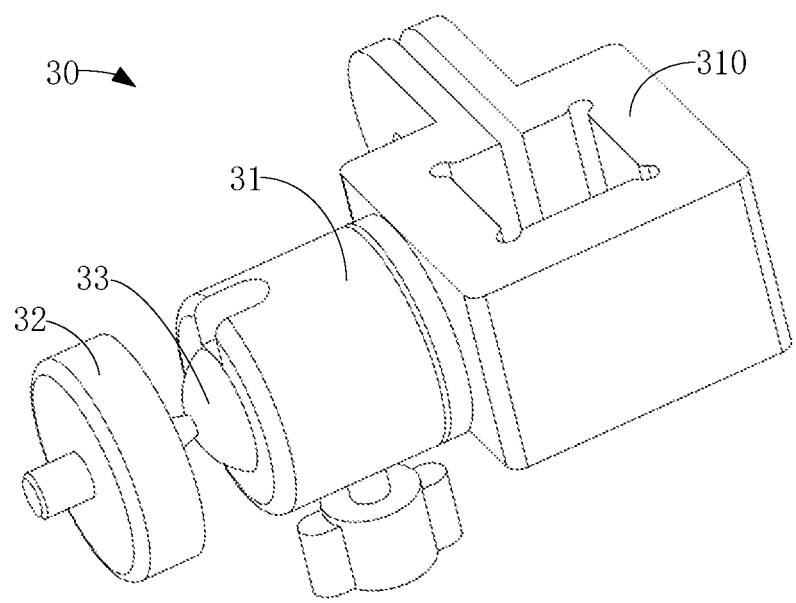
FIG. 8 is a schematic structural diagram of a hanger of the calibration bracket shown in FIG. 1.
Figure 9:
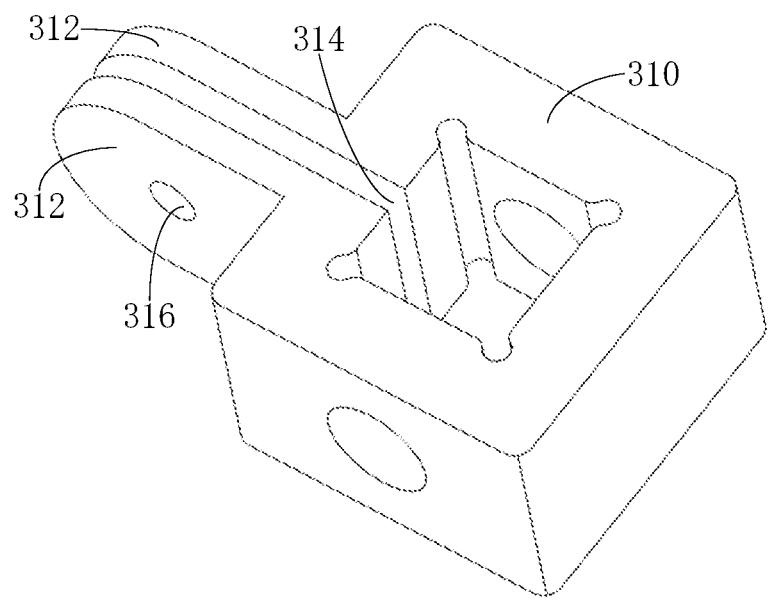
FIG. 9 is a schematic structural diagram of a ring sleeve of the hanger shown in FIG. 8.
Figure 10:
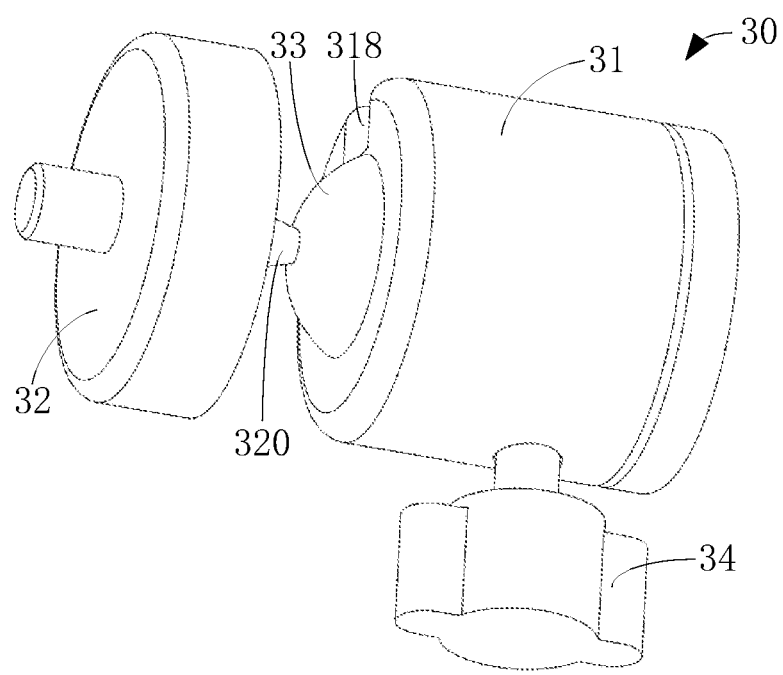
FIG. 10 is a schematic structural diagram of the hanger shown in FIG. 8 in a first state.
Figure 11:
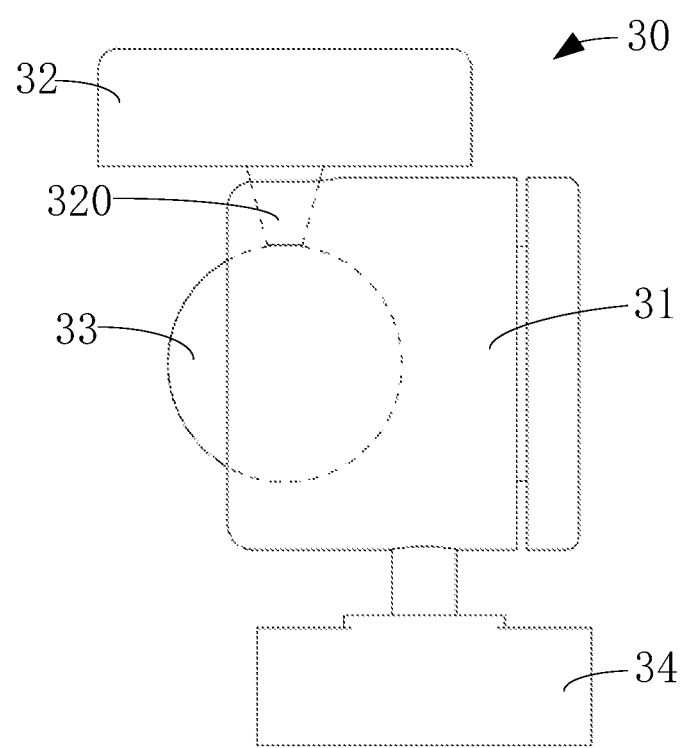
FIG. 11 is a schematic structural diagram of the hanger shown in FIG. 9 in a second state.

Referring to FIG. 6 and FIG. 7, in some other embodiments, the positioning portion 13 may further include a first positioning bump 134. Two of the first positioning bumps 134 are provided on an inner side of the hinge portion 12. A second positioning bump 228 is provided on each of faces of the angle adjustment structure 22 facing the hinge portion 12. Positions of the second positioning bumps 228 correspond to positions of the first positioning bumps 134. When the angle adjustment structure 22 is rotated until an included angle between the length direction of the support rod 20 and a bottom face of the base 10 is about 90 degrees, the first positioning bump 134 is in contact with the second positioning bump 228. The support rod 20 is fixed to the base 10, thereby implementing the limiting between the support rod 20 and the base 10.

Referring to FIG. 8 to FIG. 11 together, the hanger 30 includes a connecting shaft 31, a movable shaft 32 and a universal ball 33. The connecting shaft 31 is connected to the support rod 20. The universal ball 33 is connected to the connecting shaft 31 and the movable shaft 32. The movable shaft 32 can rotate about the center of the universal ball 33 relative to the connecting shaft 31.

A ring sleeve is provided at one end of the connecting shaft 31. The ring sleeve includes an annular portion 310 and two locking portions 312. The annular portion 310 is sleeved on the sliding rod 23. The annular portion 310 is movable relative to the sliding rod 23 in the length direction of the sliding rod 23. The annular portion 310 is in a non-closed ring shape. A cross section formed by an inner wall of the annular portion 310 is rectangular. The inner wall of the annular portion 310 is in contact with the sliding rod 23. The inner wall of the annular portion 310 is adapted to the shape of the sliding rod 23. A gap slot 314 is provided on the annular portion 310. The two locking portions 312 extend outward from an outer wall of the annular portion 310. The two locking portions 312 are respectively provided on two ends of the gap slot 314, and there is a gap between the two locking portions 312. A third through hole 316 is provided on each of the two locking portions 312. Axes of the two third through holes 316 coincide with each other. A locking apparatus (not shown) is used to pass through the two third through holes 316 to press against the two locking portions 312 to reduce the gap between the two locking portions 312 and the gap of the gap slot 314. The annular portion 310 is locked and fixed to the support rod 20. Preferably, the locking apparatus uses a bolt and a nut to mate with each other. One end of the bolt passes through the two third through holes 316, and then the nut is used for locking.

It may be understood that, in some other embodiments, the sliding rod 23 and the inner wall of the annular portion 310 are disposed as other shapes, for example, polygons with mutually mated sections. The annular portion 310 can move only in the length direction of the sliding rod 23 relative to the sliding rod 23. The annular portion 310 can be prevented from moving toward other directions relative to the sliding rod 23. The "mutually matched" herein does not necessarily require that the cross-section shape of the sliding rod 23 is the same as the shape formed by the inner wall of the annular portion 310. For example, the shape formed by the inner wall of the annular portion 310 may be set as a hexagon. The cross-section shape of the sliding rod 23 may be set as a quadrilateral connected to the hexagon. In this way, the annular portion 310 can move only in the length direction of the sliding rod 23 relative to the sliding rod 23. The inner walls of the sliding rod 23 and the annular portion 310 may also be elliptical cylindrical tubes that mate with each other. The elliptical cross-section may also restrict the relative rotation between the two to a certain extent.

A spherical receiving cavity is provided at an other end of the connecting shaft 31. The universal ball 33 is partially received in the receiving cavity. The universal ball 33 is rotatable in any direction in the receiving cavity. A receiving groove 318 is provided on an upper side of the receiving cavity of the connecting shaft 31. The receiving groove 318 is in communication with the receiving cavity. A connecting rod 320 is provided at one end of the movable shaft 32. The connecting rod 320 is fixed with the universal ball 33. The connecting rod 320 is rotatable about the center of the universal ball 33 in a plurality of directions relative to the connecting shaft 31. An other end of the movable shaft 32 is used to hang the calibration element. Therefore, multi-directional adjustment of the angle of the calibration element and flexible rotation is achieved. When an axis of the movable shaft 32 is perpendicular to an axis of the connecting shaft 31, the connecting rod 320 is received in the receiving groove 318. The movable shaft 32 can be folded relative to the connecting shaft 31, so as to save space and facilitate shipment. A locking structure is provided on the connecting shaft 31. The locking structure includes a locking screw 34. A screw hole adapted to the locking screw 34 is provided on the connecting shaft 31. An axis of the screw hole and the axis of the connecting shaft 31 are perpendicular to each other. The screw hole passes through an outer wall of the connecting shaft 31 to be in communication with the receiving cavity. One end of the locking screw 34 passes through the screw hole to abut against and lock the universal ball 33. Relative positions of the movable shaft 32 and the connecting shaft 31 are fixed.

It may be understood that a steering mechanism of the hanger may further be other mechanisms besides the universal ball. For example, a mechanism that can implement steering at a specific angle or steering at any angle falls within the protection scope of the disclosure. Alternatively, the hanger does not include a steering mechanism, that is, the angle of the calibration element relative to the support rod is fixed when being hung on the hanger.

In some other embodiments, the hanger 30 may be disposed as a beam structure, and the beam structure is arranged horizontally. The calibration element 40 is hung on the beam structure, and the calibration element can move along the beam structure. The beam structure is sleeved on the support rod 20. The beam structure can move in the length direction of the support rod 20, so that the calibration element 40 can move up and down or left and right.

It should be noted that hanging refers to supporting the calibration element 40 in any form. For example, the calibration element 40 may be directly or indirectly fixed to the support rod 20 or may be movably connected to the support rod 20, as long as the support rod 20 supports the calibration element 40.

Figure 12:
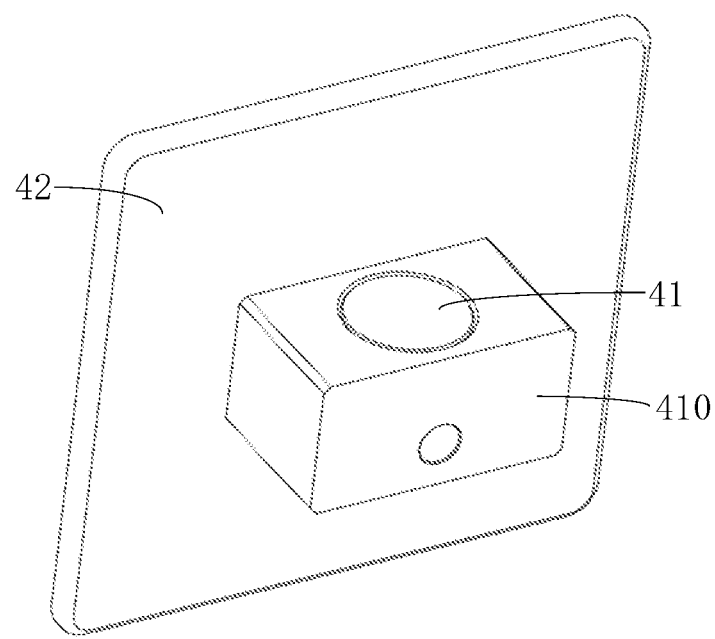
FIG. 12 is a schematic structural diagram of a spirit level and a pattern plate of the calibration bracket shown in FIG. 1.

Referring to FIG. 12, the calibration element 40 includes a spirit level 41 and a pattern plate 42. The spirit level 41 is disposed on the hanger 30. One end of the spirit level 41 is connected to the movable shaft 32. The spirit level 41 is rotatable about the center of the universal ball 33 in a plurality of directions relative to the connecting shaft 31. The spirit level 41 is configured to keep the axis of the movable shaft 32 horizontal. An other end of the spirit level 41 is connected to the pattern plate 42. A spirit level bead 410 is mounted to an upper side of the spirit level 41. When the spirit level bead 410 is in a horizontal state, the pattern plate 42 is in a vertical state. It may be understood that, in some other embodiments, the pattern plate 42 may also be a mirror, a laser emitter or the like.

Figure 13:
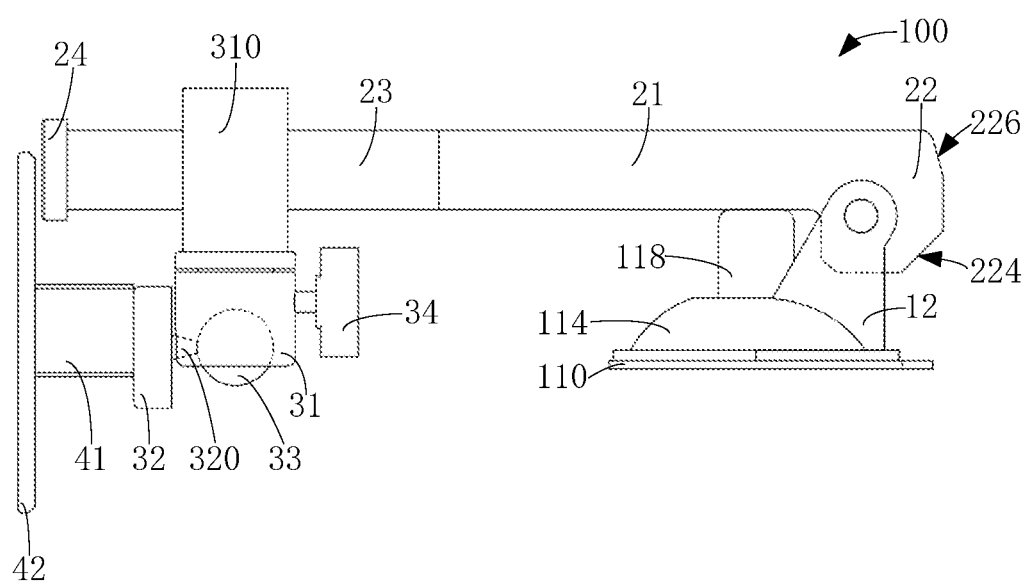
FIG. 13 is a schematic structural diagram of the calibration bracket shown in FIG. 1 in a first position.
Figure 14:
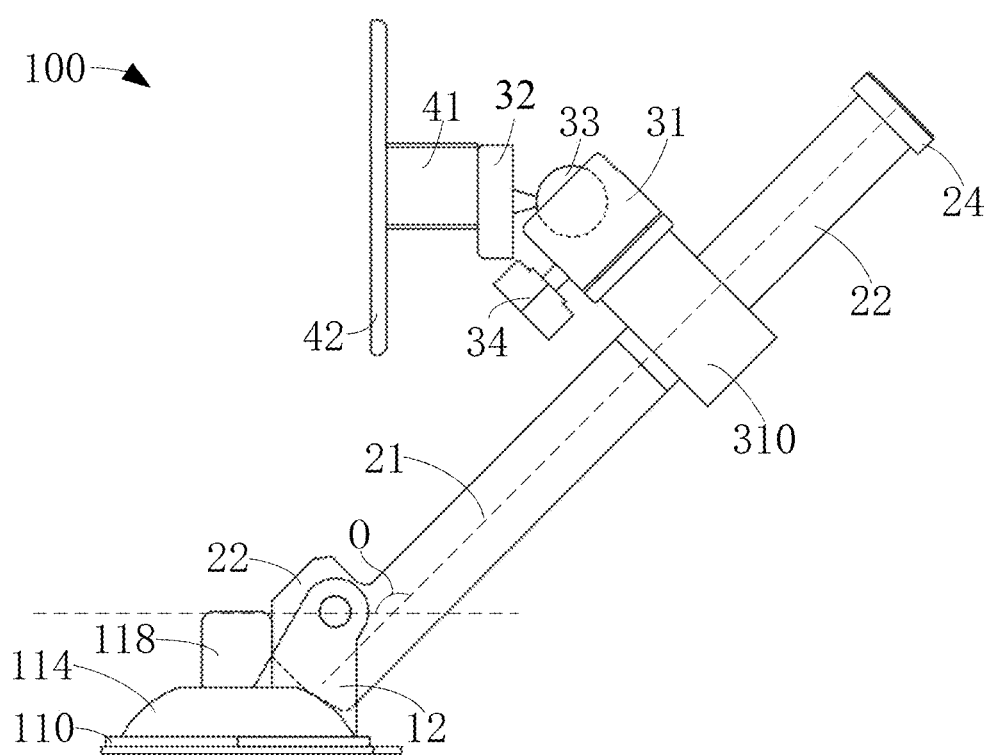
FIG. 14 is a schematic structural diagram of the calibration bracket shown in FIG. 1 in a second position.

Referring to FIG. 13 and FIG. 14, when the support rod 20 rotates about the hinge shaft 130 toward the pattern plate 42 to a first position, the main rod 21 abuts against a top face of the column. When the support rod 20 rotates about the hinge shaft 130 in a direction away from the pattern plate 42 to a second position, the first limiting face 224 of the angle adjustment structure 22 abuts against an abutting face of the column. The second limiting face 226 of the angle adjustment structure 22 abuts against an arc face of the arc-shaped portion. Preferably, when the support rod 20 rotates to the first position, an included angle between the support rod 20 and the horizontal plane is 0 degrees. The base 10 and the support rod 20 can be folded, so as to reduce the volume of the calibration bracket 100 when not in use and facilitate movement and transportation. When the support rod 20 is in the second position, an included angle O between the support rod 20 and the horizontal plane is greater than 90 degrees. Preferably, the included angle between the support rod 20 and the horizontal plane is set to 135 degrees. That is to say, the range of angular rotation of the support rod 20 is from 0 to 135 degrees. The support rod 20 is rotatable within a relatively large angle range. It can be ensured that the limiting between the angle adjustment structure 22 and the limiting portion 11 is reliable. Preferably, the cross section of the main rod 21 is set to be rectangular. At the first position, one side face of the main rod 21 abuts against the top face of the column.

In using the calibration bracket 100, the support rod 20 is rotated to be adjusted to a proper angle. The universal ball 33 is rotated to cause the spirit level 41 to be in a horizontal state and the pattern plate 42 to be in a vertical state. The pattern plate 42 is rotatable in a plurality of directions in the vertical state. Then the ring sleeve is moved to adjust a height of the pattern plate 42.

In this embodiment, the support rod 20 can rotate relative to the base 10. The main rod 21, the first limiting face 224, the second limiting face 226, the column and the arc-shaped portion are limited to control the range of angular rotation of the support rod 20. The calibration element 40 may be adjusted to maintain the pattern plate 42 vertical and adjust angles in a plurality of directions. The pattern plate 42 can move the ring sleeve of the hanger 30 to adjust the height when being in a vertical state. The support rod 20 can freely adjust the angle within the range of angular rotation. The pattern plate 42 can adjust the direction and height when being in the vertical state, which can meet various special calibration angles.

Finally, it should be noted that the foregoing embodiments are merely used for describing the technical solutions of the disclosure, but are not intended to limit the disclosure.

Under the concept of the disclosure, the technical features in the foregoing embodiments or different embodiments may be combined. The steps may be implemented in any sequence. There may be many other changes in different aspects of the disclosure as described above. For brevity, those are not provided in detail. Although the disclosure is described in detail with reference to the foregoing embodiments, those of ordinary skill in the art should understand that they may still make modifications to the technical solutions described in the foregoing embodiments or make equivalent replacements to some technical features thereof, without departing from the scope of the technical solutions of the embodiments of the disclosure.

What is claimed is:

1. A calibration bracket, comprising:
a base;
a support rod comprising a main rod and an angle adjustment structure, the main rod being connected to the angle adjustment structure, and the angle adjustment structure being movably connected to the base and being configured to adjust an angle of the main rod relative to a ground plane on which the base is located; and
a hanger, comprising a connecting shaft and a movable shaft, a ring sleeve including an annular portion is provided at one end of the connecting shaft, the annular portion is sleeved on a sliding rod provided at an end of the main rod, the annular portion is movable relative to the sliding rod in a length direction of the sliding rod, and the movable shaft is connected to the connecting shaft, the movable shaft is rotatable relative to the connecting shaft to adjust an angle of the movable shaft relative to the support rod, and the movable shaft is configured to hang a calibration element, the calibration element being configured to calibrate a device in a driver assistant system of a vehicle, the calibration element comprising a spirit level and a pattern plate.

2. The calibration bracket according to claim 1, wherein the base comprises a limiting portion configured to limit a range of movement of the angle adjustment structure.

3. The calibration bracket according to claim 2, wherein the base comprises two hinge portions;
the limiting portion is disposed between the two hinge portions; and
a first through hole is provided on each of the two hinge portions, and a second through hole is provided on the angle adjustment structure, an axis of the second through hole coinciding with axes of the two first through holes, and a hinge shaft passing through the first through holes and the second through hole to connect the angle adjustment structure to the two hinge portions.

4. The calibration bracket according to claim 2, wherein the base comprises a positioning portion configured to fix the angle adjustment structure to a specific position within the range of movement or fix the angle adjustment structure to any position within the range of movement.

5. The calibration bracket according to claim 4, wherein:
the base comprises two hinge portions;
the limiting portion is disposed between the two hinge portions; and
a first through hole is provided on each of the two hinge portions, and a second through hole is provided on the angle adjustment structure, an axis of the second through hole coinciding with axes of the two first through holes, and a hinge shaft passing through the first through holes and the second through hole to connect the angle adjustment structure to the two hinge portions.

6. The calibration bracket according to claim 4, wherein:
the hanger comprises a connecting shaft and a movable shaft;
the connecting shaft is configured to be connected to the support rod; and
the movable shaft is connected to the connecting shaft, the movable shaft is rotatable relative to the connecting shaft to adjust an angle of the movable shaft relative to the support rod, and the movable shaft is configured to hang the calibration element.

7. The calibration bracket according to claim 1, wherein the base comprises a positioning portion configured to fix the angle adjustment structure to a specific position within the range of movement or fix the angle adjustment structure to any position within the range of movement;
the positioning portion comprises a hinge shaft and a locking member, and the hinge shaft is inserted into the locking member for fixing the base and the support rod.

8. The calibration bracket according to claim 7, wherein the limiting portion comprises a top face and an abutting face; and
the main rod abuts against the top face when the support rod rotates about the hinge shaft toward the pattern plate to a first position, and the angle adjustment structure abuts against the abutting face when the support rod rotates about the hinge shaft in a direction away from the pattern plate to a second position, the range of movement of the angle adjustment structure being between the first position and the second position.

9. The calibration bracket according to claim 8, wherein the top face is substantially parallel to the ground plane on which the base is located.

10. The calibration bracket according to claim 8, wherein when the angle adjustment structure abuts against the abutting face, an angle of the support rod relative to the ground plane on which the base is located is greater than 90 degrees.

11. The calibration bracket according to claim 1, wherein a receiving cavity is provided on the connecting shaft, the receiving cavity being configured to receive a universal ball, the universal ball being rotatable in any direction in the receiving cavity; and
the movable shaft is connected to the universal ball and is rotatable about a center of the universal ball relative to the connecting shaft.

12. The calibration bracket according to claim 1, wherein the hanger further comprises a locking structure; and
the locking structure is configured to fix a position of the movable shaft relative to the connecting shaft.

13. The calibration bracket according to claim 12, wherein
the locking structure comprises a locking screw, a screw hole mated with the locking screw being provided on the connecting shaft, the locking screw passing through the screw hole to abut against the universal ball to fix the position of the movable shaft relative to the connecting shaft.

14. The calibration bracket according to claim 13, wherein
a receiving groove is provided on the connecting shaft, the receiving groove being in communication with the receiving cavity; and when an axis of the connecting shaft is perpendicular to an axis of the movable shaft, the movable shaft is received in the receiving groove.

15. The calibration bracket according to claim 1, wherein the spirit level is disposed on the hanger, the spirit level being configured to keep the axis of the movable shaft horizontal.

\* \* \* \* \*